(12) United States Patent
Marcone et al.

(10) Patent No.: US 11,877,288 B2
(45) Date of Patent: Jan. 16, 2024

(54) DYNAMIC ADAPTATION OF PUCCH RESOURCES IN THE CASE OF DMRS BUNDLING

(71) Applicant: Nokia Technologies Oy, Espoo (FI)

(72) Inventors: Alessio Marcone, Munich (DE); Nhat-Quang Nhan, Reims (FR); Marco Maso, Issy les Moulineaux (FR)

(73) Assignee: Nokia Technologies Oy, Espoo (FI)

( * ) Notice: Subject to any disclaimer, the term of this patent is extended or adjusted under 35 U.S.C. 154(b) by 372 days.

(21) Appl. No.: 17/388,185

(22) Filed: Jul. 29, 2021

(65) Prior Publication Data

US 2023/0037267 A1 Feb. 2, 2023

(51) Int. Cl.
*H04W 72/21* (2023.01)
*H04W 72/044* (2023.01)
*H04L 27/26* (2006.01)
*H04W 72/23* (2023.01)

(52) U.S. Cl.
CPC ......... *H04W 72/21* (2023.01); *H04L 27/2601* (2013.01); *H04W 72/044* (2013.01); *H04W 72/23* (2023.01)

(58) Field of Classification Search
None
See application file for complete search history.

(56) References Cited

U.S. PATENT DOCUMENTS

2017/0359815 A1\* 12/2017 Chendamarai Kannan ................. H04L 5/0057
2022/0104239 A1\* 3/2022 Papasakellariou .. H04W 52/365
2022/0224456 A1\* 7/2022 Yi ..................... H04W 72/1268

(Continued)

OTHER PUBLICATIONS

3GPP TSG RAN WG1 Meeting #104bis-e e-Meeting, R1-2104119 "Reply LS on PUCCH and PUSCH Repetition" Apr. 12-Apr. 20, 2021.
3GPP TSG RAN WG1 Meeting #106-e e-Meeting, R1-210xxxx "Draft Report of 3GPP TSG RAN WG1 #105e-v0.2.0" Online Meeting, May 10-27, 2021.

(Continued)

*Primary Examiner* — Hassan A Phillips
*Assistant Examiner* — Gautam Sharma
(74) *Attorney, Agent, or Firm* — Harrington & Smith

(57) ABSTRACT

In accordance with example embodiments of the invention there is at least a method and apparatus to perform determining a mismatch between at least one of a location or the number of physical resource blocks occupied by at least one of a plurality of physical uplink shared channel transmissions and at least one of a location or a number of physical resource blocks occupied by a physical uplink control channel for a physical uplink control channel transmission; and based on the determined mismatch, performing operations comprising at least one of: multiplexing uplink control information for the physical uplink control channel transmission with the at least one of the plurality of physical uplink shared channel transmissions, adapting the at least one of the location or the number of physical resource blocks of the physical uplink control channel transmission for matching the at least one of the location or the number of physical resource blocks occupied by the at least one of the plurality of physical uplink shared channel transmissions, or determining an information and communicate the information using at least one of downlink control information, medium access control—control element or higher layer signaling for overcoming at least the mismatch.

18 Claims, 6 Drawing Sheets

(56) References Cited

U.S. PATENT DOCUMENTS

| | | | | |
|---|---|---|---|---|
| 2022/0225240 A1* | 7/2022 | Fakoorian | ............ | H04W 72/21 |
| 2022/0225322 A1* | 7/2022 | Shim | ................. | H04W 72/21 |
| 2022/0225388 A1* | 7/2022 | You | ................. | H04W 72/0446 |
| 2022/0247601 A1* | 8/2022 | Sridharan | ............. | H04L 5/0066 |
| 2022/0248430 A1* | 8/2022 | Ly | ....................... | H04L 5/0094 |
| 2022/0279455 A1* | 9/2022 | Cozzo | ................ | H04W 52/221 |
| 2022/0279523 A1* | 9/2022 | He | ....................... | H04W 72/56 |
| 2022/0368460 A1* | 11/2022 | Takahashi | ............ | H04W 72/12 |
| 2022/0377723 A1* | 11/2022 | Yang | .................... | H04L 1/1854 |
| 2023/0008498 A1* | 1/2023 | Lee | ...................... | H04W 72/23 |
| 2023/0033400 A1* | 2/2023 | Maso | ................... | H04W 72/23 |
| 2023/0037267 A1* | 2/2023 | Marcone | .............. | H04W 72/23 |
| 2023/0283342 A1* | 9/2023 | Ahmed Salem | ....... | H04B 7/066 |
| | | | | 370/329 |
| 2023/0291527 A1* | 9/2023 | Myung | ................ | H04W 72/23 |
| | | | | 370/329 |
| 2023/0299830 A1* | 9/2023 | Ly | ....................... | H04B 7/0645 |
| | | | | 370/252 |

OTHER PUBLICATIONS

3GPP TSG RAN WG1 #104-e e-Meeting, R1-210712 "Joint Channel Estimation for PUSCH Coverage Enhancements" Jan. 25-Feb. 5, 2021.

3GPP TSG RAN WG1 #104-bis-e e-Meeting, R1-2103382 " Joint Channel Estimation for PUSCH Coverage Enhancements" Apr. 12-Apr. 20, 2021.

3GPP TSG RAN WG1#105-e, e-Meeting, R1-2105903 "Joint Channel Estimation for PUSCH Coverage Enhancements" May 19-May 27, 2021.

* cited by examiner

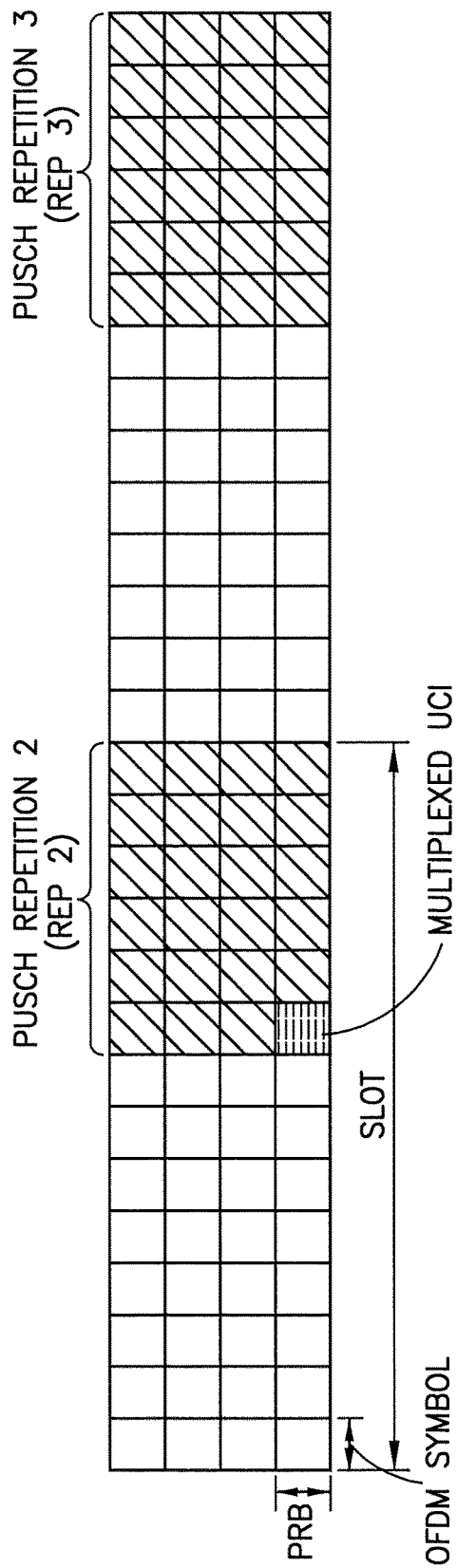
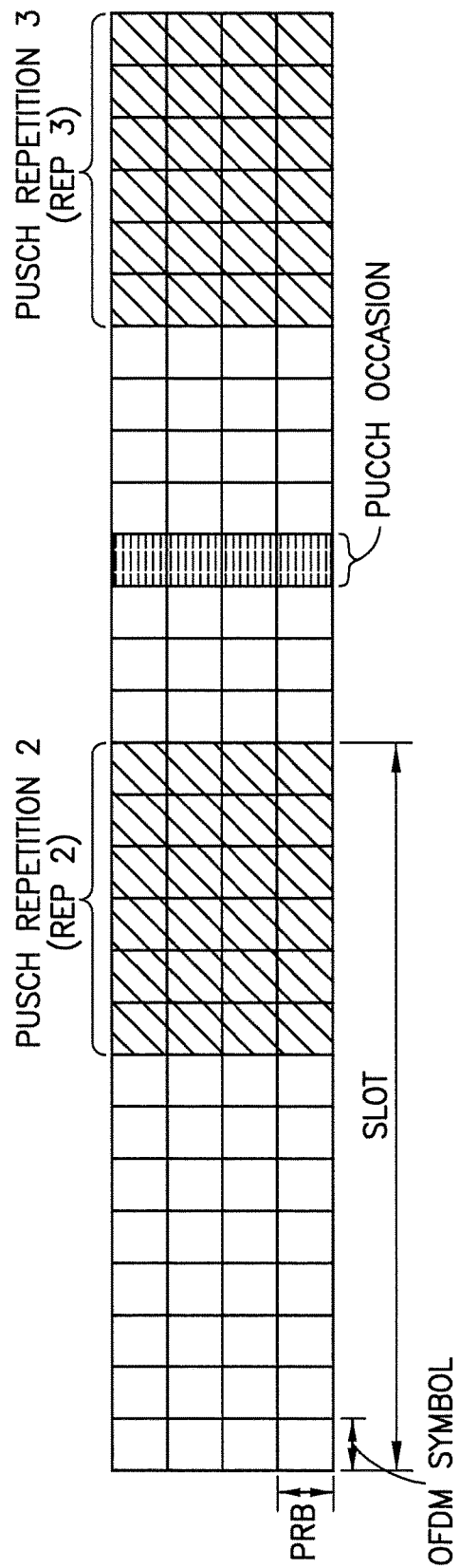

DYNAMIC ADAPTATION OF PUCCH RESOURCES IN THE CASE OF DMRS BUNDLING

TECHNICAL FIELD

The teachings in accordance with the exemplary embodiments of this invention relate generally to coverage enhancements using joint channel estimation across physical uplink shared channel resources and, more specifically, relate to coverage enhancements using joint channel estimation across physical uplink shared channel resources with applicable physical uplink control channel enhancements.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
- ACK Acknowledgement
- CA Carrier aggregation
- CC Component Carrier
- CSI Channel State Information
- DC Dual connectivity
- DMRS Demodulation Reference Signal
- FFS For Further Study
- HARQ Hybrid Automatic Repeat Request
- HARQ-ACK Hybrid Automatic Repeat Request Acknowledgement
- LS Liaison Statement
- OFDM Orthogonal Frequency Division Multiplexing
- PUCCH Physical Uplink Control Channel
- PUSCH Physical Uplink Shared Channel
- RAN Remote Access Network
- RE Resource Element
- SPS Semi-Persistent Scheduling
- TB Transport Block
- TBoMS Transport block over multiple slots
- UCI Uplink Control Information
- UE User Equipment
- UL Uplink At the time of this application, as the demand for radio access continues to increase, there exists a need for further improvements in different aspects of communication systems including improving data rate, latency, reliability, and/or mobility for wireless communication for cellular wireless communication systems, such as for 5G NR. Such improvements relate to coverage enhancements for such communications.

Example embodiments of the invention work to further improve such operations.

SUMMARY

This section contains examples of possible implementations and is not meant to be limiting.

In an example aspect of the invention, there is an apparatus, such as a user equipment side apparatus, comprising: at least one processor; and at least one non-transitory memory including computer program code, where the at least one non-transitory memory and the computer program code are configured, with the at least one processor, to cause the apparatus to at least: determine a mismatch between location and the number of physical resource blocks occupied by at least one of a plurality of physical uplink shared channel transmissions and location and the number of physical resource blocks occupied by a physical uplink control channel for a physical uplink control channel transmission occurring in between consecutive ones of the plurality of physical uplink shared channel transmissions and not overlapping in time with at least one of the plurality of physical uplink shared channel transmissions; and based on the determined mismatch, perform operations comprising at least one of: multiplexing uplink control information for the physical uplink control channel transmission with the at least one of the plurality of physical uplink shared channel transmissions, or adapting the location and the number of physical resource blocks of the physical uplink control channel transmission for matching the location and the number of physical resource blocks occupied by the at least one of the plurality of physical uplink shared channel transmissions.

In another example aspect of the invention, there is a method comprising: determining a mismatch between location and the number of physical resource blocks occupied by at least one of a plurality of physical uplink shared channel transmissions and location and the number of physical resource blocks occupied by a physical uplink control channel for a physical uplink control channel transmission occurring in between consecutive ones of the plurality of physical uplink shared channel transmissions and not overlapping in time with at least one of the plurality of physical uplink shared channel transmissions; and based on the determined mismatch, performing operations comprising at least one of: multiplexing uplink control information for the physical uplink control channel transmission with the at least one of the plurality of physical uplink shared channel transmissions, or adapting the location and the number of physical resource blocks of the physical uplink control channel transmission for matching the location and the number of physical resource blocks occupied by the at least one of the plurality of physical uplink shared channel transmissions.

A further example embodiment is an apparatus and/or method comprising the apparatus and the method of the previous paragraphs, wherein multiplexing uplink control information for the physical uplink control channel transmission with the at least one of the plurality of physical uplink shared channel transmissions is based on timeline conditions, wherein based on the gap between two consecutive physical uplink shared channel transmissions of the plurality of physical uplink shared channel transmissions being equal to X orthogonal frequency division multiplexing symbols, where X is an integer, the user equipment is configured to perform at least one of: multiplexing the uplink control information in a previous physical uplink shared channel transmission occasion if the physical uplink control channel occasion occurs in an orthogonal frequency division multiplexing symbol which is spaced from an end of a previous physical uplink shared channel transmission occasion by less or equal than X/2 symbols, or multiplexing the uplink control information in following physical uplink shared channel transmission occasion if the physical uplink control channel occasion occurs in an orthogonal frequency division multiplexed symbol which is spaced from an end of a previous physical uplink shared channel transmission occasion by more than X/2 symbols or multiplexing the uplink control information in a following physical uplink shared channel transmission occasion right after the physical uplink control channel, or multiplexing the uplink control information in a following physical uplink shared channel transmission occasion that is not associated with a self-decodable redundancy version index, wherein a redundancy version index indicates the part of encoded bits that are mapped to the physical uplink shared channel, wherein the performing is based on a further conditioned on a last orthogonal frequency division multiplexing symbol of a physical downlink shared channel associated with downlink control information scheduling the physical uplink control channel transmission being at least Y orthogonal frequency division multiplexing symbols earlier than a first orthogonal frequency division multiplexing symbol of the physical uplink shared channel transmission over which the corresponding uplink control information would be multiplexed, wherein if the further condition is not satisfied, the multiplexing is performed on the next physical uplink shared channel that satisfies the condition or the multiplexing is not performed, wherein the multiplexing of the uplink control information on the physical uplink shared channel is further based on a determined uplink control information payload size of the uplink control information being less than a first threshold value, wherein the multiplexing of the uplink control information on the physical uplink shared channel is further based on a ratio between resource elements occupied by the multiplexed uplink control information and resource elements of the physical uplink shared channel being less than a second threshold value, wherein adapting the physical resource blocks of the physical uplink control channel for matching the location and number of physical resource blocks occupied by the at least one of the plurality of physical uplink shared channel transmissions is based on the physical resource blocks occupied by the at least one of the plurality of physical uplink shared channel transmission being less than or equal to a third threshold value, wherein at least one of the first threshold, wherein the physical uplink control channel after the adaptation is used to convey either the uplink control information only or both uplink control information and uplink data information, wherein the second threshold or the third threshold is received by the user equipment from the network node of the communication network, wherein a downlink control information is received from a network node of the communication network, and wherein the downlink control information instructs the user equipment which of the operations to perform based on the mismatch, wherein the plurality of physical uplink shared channel transmissions is of at least one of a same physical uplink shared channel or different physical uplink shared channels, and/or wherein the adapting is a temporary adaptation valid for at least one physical uplink control channel transmission.

A non-transitory computer-readable medium storing program code, the program code executed by at least one processor to perform at least the method as described in the paragraphs above.

In another example aspect of the invention, there is an apparatus comprising: means for determining a mismatch between location and the number of physical resource blocks occupied by at least one of a plurality of physical uplink shared channel transmissions and location and the number of physical resource blocks occupied by a physical uplink control channel for a physical uplink control channel transmission occurring in between consecutive ones of the plurality of physical uplink shared channel transmissions and not overlapping in time with at least one of the plurality of physical uplink shared channel transmissions; and means, based on the determined mismatch, for performing operations comprising at least one of: multiplexing uplink control information for the physical uplink control channel transmission with the at least one of the plurality of physical uplink shared channel transmissions, or means for adapting the location and the number of physical resource blocks of the physical uplink control channel transmission for matching the location and the number of physical resource blocks occupied by the at least one of the plurality of physical uplink shared channel transmissions.

In accordance with the example embodiments as described in the paragraph above, at least the means for determining, performing, and adapting comprises a network interface, and computer program code stored on a computer-readable medium and executed by at least one processor.

In another example aspect of the invention, there is an apparatus, such as a network side apparatus, comprising: at least one processor; and at least one non-transitory memory including computer program code, where the at least one non-transitory memory and the computer program code are configured, with the at least one processor, to cause the apparatus to at least: determine by a network node of a communication network a mismatch between location and the number of physical resource blocks occupied by at least one of a plurality of physical uplink shared channel transmissions and location and the number of physical resource blocks occupied by a physical uplink control channel for a physical uplink control channel transmission occurring in between the plurality of physical uplink shared channel transmissions and not overlapping in time with at least one of the plurality of physical uplink shared channel transmissions; and based on the determined mismatch further determine an information and communicate the information to a user equipment using at least one of downlink control information, medium access control—control element or higher layer signaling for: overcoming at least the mismatch between location and the number of physical resource blocks occupied by the at least one of a plurality of physical uplink shared channel transmissions and location and the number of physical resource blocks occupied by the physical uplink control channel for the physical uplink control channel transmission.

In another example aspect of the invention, there is a method comprising: determining by a network node of a communication network a mismatch between location and the number of physical resource blocks occupied by at least one of a plurality of physical uplink shared channel transmissions and location and the number of physical resource blocks occupied by a physical uplink control channel for a physical uplink control channel transmission occurring in between the plurality of physical uplink shared channel transmissions and not overlapping in time with at least one of the plurality of physical uplink shared channel transmissions; and based on the determined mismatch further determining information and communicating the information to a user equipment using at least one of downlink control information, medium access control—control element or higher layer signaling for: overcoming at least the mismatch between location and the number of physical resource blocks occupied by the at least one of a plurality of physical uplink shared channel transmissions and location and the number of physical resource blocks occupied by the physical uplink control channel for the physical uplink control channel transmission.

A further example embodiment is an apparatus and/or method comprising the apparatus and the method of the previous paragraphs, wherein the information is instructing the user equipment to, perform at least one of: multiplexing uplink control information for the physical uplink control channel transmission with the at least one of the plurality of physical uplink shared channel transmissions, or adapting the location and the number of physical resource blocks of the physical uplink control channel transmission for matching the location and the number of physical resource blocks occupied by the at least one of the plurality of physical uplink shared channel transmissions, wherein based on a size of the uplink control information being smaller than at least one threshold or based on neighboring physical resource blocks to the configured and/or scheduled physical resource blocks of the physical uplink control channel expected to be occupied by at least one of other transmissions of other user equipment, the information is indicating to perform the operation of: multiplexing uplink control information for the physical uplink control channel transmission with the at least one of the plurality of physical uplink shared channel transmissions, wherein there is multiplexing uplink control information for the physical uplink control channel transmission with the at least one of the plurality of physical uplink shared channel transmissions, wherein based on a size of the uplink control information being larger than at least one threshold or based on neighboring physical resource blocks to the configured and/or scheduled physical resource blocks of the physical uplink control channel not expected to be occupied by at least one of other transmissions of other user equipment, the downlink control information is indicating to perform the operation of: adapting the physical resource blocks of the physical uplink control channel transmission for matching the physical resource blocks occupied by the at least one of the plurality of physical uplink shared channel, wherein based on a size of the uplink control information being smaller than at least one threshold or based on neighboring physical resource blocks to the configured and/or scheduled physical resource blocks of the physical uplink control channel expected to be occupied by at least one of other transmissions of other user equipment, the information is indicating to perform the operation of: multiplexing uplink control information for the physical uplink control channel transmission with the at least one of the plurality of physical uplink shared channel transmissions, wherein based on a size of the uplink control information being larger than at least one threshold or based on neighboring physical resource blocks to the configured and/or scheduled physical resource blocks of the physical uplink control channel not expected to be occupied by at least one of other transmissions of other user equipment, the downlink control information is indicating to perform the operation of: adapting the physical resource blocks of the physical uplink control channel transmission for matching the physical resource blocks occupied by the at least one of the plurality of physical uplink shared channel, wherein the plurality of physical uplink shared channel transmissions is of at least one of a same physical uplink shared channel or different physical uplink shared channels, and/or wherein the at least one threshold is indicated in the information from the network node.

A non-transitory computer-readable medium storing program code, the program code executed by at least one processor to perform at least the method as described in the paragraphs above.

In another example aspect of the invention, there is an apparatus comprising: means for determining by a network node of a communication network a mismatch between location and the number of physical resource blocks occupied by at least one of a plurality of physical uplink shared channel transmissions and location and the number of physical resource blocks occupied by a physical uplink control channel for a physical uplink control channel transmission occurring in between the plurality of physical uplink shared channel transmissions and not overlapping in time with at least one of the plurality of physical uplink shared channel transmissions; and means, based on the determined mismatch for further determining information and communicating the information to a user equipment using at least one of downlink control information, medium access control—control element or higher layer signaling for: overcoming at least the mismatch between location and the number of physical resource blocks occupied by the at least one of a plurality of physical uplink shared channel transmissions and location and the number of physical resource blocks occupied by the physical uplink control channel for the physical uplink control channel transmission.

In accordance with the example embodiments as described in the paragraph above, at least the means for determining and further determining comprises a network interface, and computer program code stored on a computer-readable medium and executed by at least one processor.

A communication system comprising the user equipment side apparatus and the network side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 4 shows a pictorial representation of Solution 1 in accordance with example embodiments of the invention;

FIG. 5 shows a pictorial representation of Solution 2 in accordance with example embodiments of the invention;

DETAILED DESCRIPTION

Figure 1:
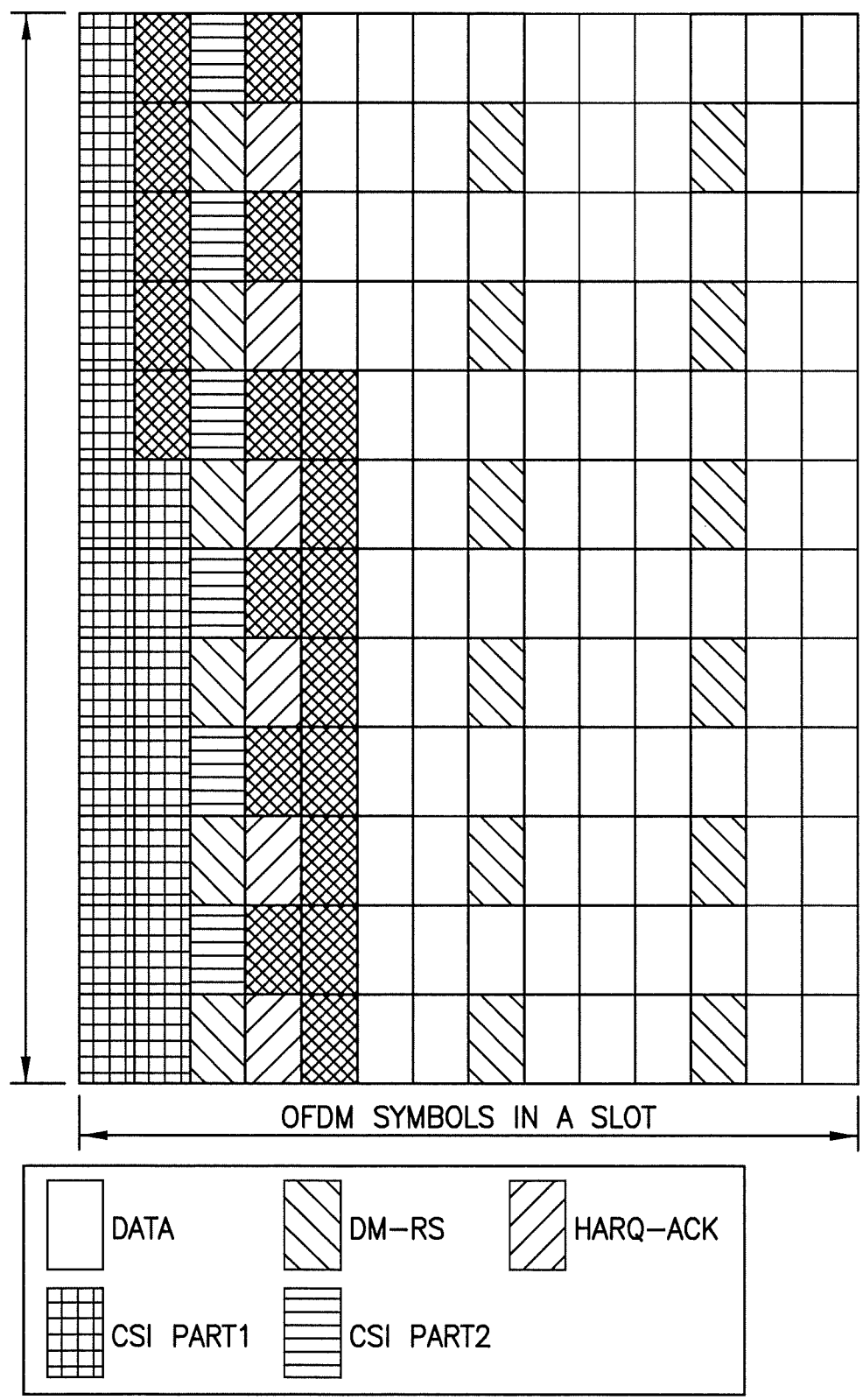
FIG. 1 shows UCI multiplexing on PUSCH.

In example embodiments of the invention there is provided coverage enhancements using joint channel estimation across physical uplink shared channel resources with applicable physical uplink control channel enhancements.

Example embodiments of the invention targets normative work carried out in the context of Joint channel estimation across PUSCH transmissions and, if applicable, PUCCH enhancements.

DMRS Bundling

The terms "DMRS bundling" and "joint channel estimation" are equivalent in the context of example embodiments of this invention. This technique targets improvements in the channel estimation quality for the demodulation of PUSCH/

PUCCH at the receiver (gNB) by using jointly the DMRS symbols among several PUSCH/PUCCH transmissions (possibly in different slots) that comply with the required conditions to maintain power consistency and phase continuity. Indeed, two DMRS signals can be bundled together to provide a more reliable channel estimate only if they are subject to very similar, if not the same, channel conditions.

Such conditions include not only the response of the surrounding environment, but also the response of the transmitting and receiving circuitry. So, even if the environment response does not change within the time of the several PUSCH/PUCCH transmissions, care must be taken such that (at least) the UE transmitter circuit response is also unchanged and this can be guaranteed by the UE maintaining power consistency and phase continuity across the different transmissions.

UCI Multiplexing on PUSCH

As specified in standards documentation at the time of this application uplink control information (UCI) messages consist of a hybrid automatic repeat request acknowledgment (HARQ-ACK), channel state information (CSI), and a scheduling request (SR). These UCI messages are encoded and transmitted through the physical uplink control channel (PUCCH) or are multiplexed on the PUSCH, in the case the PUCCH and PUSCH resources overlap in time.

If a UE transmits a PUSCH over multiple slots and the UE would transmit a PUCCH with HARQ-ACK and/or CSI information over a single slot that overlaps with the PUSCH transmission in one or more slots of the multiple slots, and the PUSCH transmission in the one or more slots fulfills the conditions for multiplexing the HARQ-ACK and/or CSI information, the UE multiplexes the HARQ-ACK and/or CSI information in the PUSCH transmission in the one or more slots. The UE does not multiplex HARQ-ACK and/or CSI information in the PUSCH transmission in a slot from the multiple slots if the UE would not transmit single-slot PUCCH with HARQ-ACK and/or CSI information in the slot in case the PUSCH transmission was absent.

Further, as specified in standards documentation at the time of this application the encoded data, encoded HARQ-ACK, encoded CSI part 1, and encoded CSI part 2 are multiplexed to form a codeword.

The UCI information is transmitted in only the OFDM symbols that are unused for demodulation reference signal (DM-RS) transmission. In any OFDM symbol used for UCI transmission for a UCI type, the mapping of that UCI type depends on the number of resource elements (REs) available for UCI transmission and the remaining REs required for that UCI type. If the number of remaining REs required for that UCI type in an OFDM symbol is greater than half of the available REs for the UCI transmission, the mapping of the UCI type is contiguous. Otherwise, the mapping is uniformly distributed across available REs in an OFDM symbol to achieve the diversity gain. The number of coded bits that are occupied in an RE for UCI or data transmission, is equal to the product of the modulation order and the number of layers.

The coded HARQ-ACK bits are placed starting from the first OFDM symbol after the first DM-RS OFDM symbols of the shared channel symbol allocation. The coded CSI part 1 or part 2 bits are placed at the first OFDM symbol in the shared channel symbol allocation which is not used for DM-RS symbols. An example of UCI multiplexing on PUSCH is shown in FIG. 1.

It is worth noting that, according to operations specified in standards documentation at the time of this application, UCI multiplexing on PUSCH repetitions is not currently allowed if the DCI scheduling the PUCCH comes later than the DCI scheduling the PUSCH repetitions.

A UE does not expect to detect a DCI format scheduling a PDSCH reception or a SPS PDSCH release, or a DCI format including a One-shot HARQ-ACK request field with value 1, and indicating a resource for a PUCCH transmission with corresponding HARQ-ACK information in a slot if the UE previously detects a DCI format scheduling a PUSCH transmission in the slot and if the UE multiplexes HARQ-ACK information in the PUSCH transmission.

Conditions to guarantee phase continuity and power consistency across different PUSCH/PUCCH transmissions are:
  Modulation order does not change,
  RB allocation in terms of length and frequency position should not be changed, and intra-slot and inter-slot frequency hopping is not enabled within a repetition bundle,
No change on transmission power level of its own component carrier (CC), i.e., no change on the power control parameters specified in TS 38.213, and also when own CC is not impacted by other concurrent CC(s) that are configured for inter-band carrier aggregation (CA) or dual connectivity (DC) for same UE with dynamic power sharing and no change in any configured CC s that are part of configured intra-band uplink CA or DC, No UL beam switching for FR2 UE occurs,
  For the case there is a non-zero un-scheduled gap in between two successive transmissions, it is feasible to keep phase continuity and power consistency at least for a non-zero un-scheduled gap less than 14 symbols when UE is not required to meet the existing off power requirements, and
  For the case with other UL channels in between repetitions, at least if the other scheduled signals/channels during the non-zero gap have the same settings in antenna port, occupied PRBs and UL power than the repeated transmission signals/channels, it is feasible to maintain the phase continuity and power consistency across the repetitions.

It is possible to understand from the underlined part above that in order for a UE to keep phase continuity across different transmissions, the number and position of occupied RBs shall not change over time. This means that even when a first channel is repeated a number of times (and hence does not change its frequency allocation), and a second UL channel is transmitted in between the repetitions, this second UL channel cannot have different configuration in the number and position of the PRBs in order to maintain phase continuity. For example, FIG. 1 shows a scenario of non-back-to-back (separated by a time gap) PUSCH repetitions in which a configured periodic PUCCH transmission occurs in between the second and third repetition. If in this case the PUCCH transmission has different settings (in terms of PRB), the UE would not be able to keep phase continuity between repetition 2 and repetition 3. Joint channel estimation cannot be performed at the receiver in this case.

It is worth noticing that this is a very likely scenario, considering that the periodic PUCCH (frequency) resources are RRC configured and will likely be different from the resources dynamically assigned to the UE for a PUSCH transmission (with repetitions).

Although the example refers to configured PUCCH resources, this problem is not restricted to such cases but can also occur in the case the PUCCH resource is scheduled prior to the scheduling of the PUSCH transmissions across multiple slots (or repetitions).

In example embodiments of this invention there is proposed solutions to solve the problem presented herein, i.e., in case a PUCCH channel (whose resources are either dynamically indicated or RRC configured) occurs in between (and without overlapping with any symbols of) two adjacent PUSCH repetitions, or PUSCH transmissions of the same TB over multiple slots, and is characterized by different settings (at least in terms of PRB allocation) than the PUSCH channel.

Figure 6:
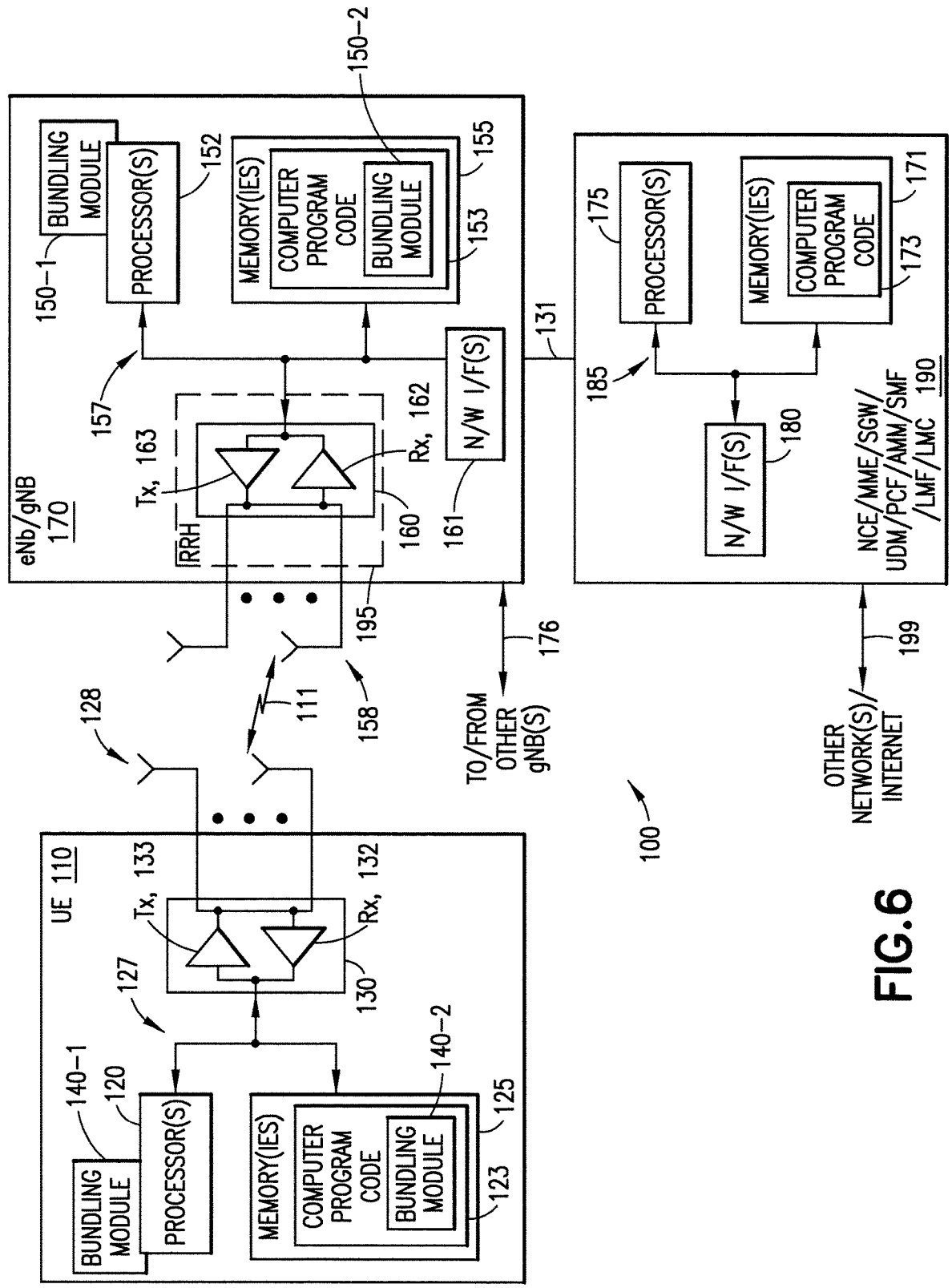
FIG. 6 shows a high level block diagram of various devices used in carrying out various aspects of the invention.

Before describing the example embodiments of the invention in further detail reference is made to FIG. 6. FIG. 6 shows a block diagram of one possible and non-limiting exemplary system in which the exemplary embodiments may be practiced.

As shown in FIG. 6, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an Bundling Module 140 which is configured to perform the example embodiments of the invention as described herein. The Bundling Module 140 may be implemented in hardware by itself of as part of the processors and/or the computer program code of the UE 110. The Bundling Module 140 comprising one of or both parts 140-1 and/or 140-2, which may be implemented in a number of ways. The Bundling Module 140 may be implemented in hardware as Bundling Module 140-1, such as being implemented as part of the one or more processors 120. The Bundling Module 140-1 may be implemented also as an integrated circuit or through other hardware such as a programmable gate array. In another example, the Bundling Module 140 may be implemented as Bundling Module 140-2, which is implemented as computer program code 123 and is executed by the one or more processors 120. Further, it is noted that the Bundling Modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with eNB/gNB 170 via a wireless link 111.

The eNB/gNB 170 (NR/5G Node B or possibly an evolved NB) is a base station (e.g., for LTE, long term evolution) that provides access by wireless devices such as the UE 110 to the wireless network 100. The eNB/gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The eNB/gNB 170 includes an Bundling Module 150 which is configured to perform example embodiments of the invention as described herein. The Bundling Module 150 may comprise one of or both parts 150-1 and/or 150-2, which may be implemented in a number of ways. The Bundling Module 150 may be implemented in hardware by itself or as part of the processors and/or the computer program code of the eNB/gNB 170. Bundling Module 150-1, such as being implemented as part of the one or more processors 152. The Bundling Module 150-1 may be implemented also as an integrated circuit or through other hardware such as a programmable gate array. In another example, the Bundling Module 150 may be implemented as Bundling Module 150-2, which is implemented as computer program code 153 and is executed by the one or more processors 152. Further, it is noted that the Bundling Modules 150-1 and/or 150-2 are optional. For instance, the one or more memories 155 and the computer program code 153 may be configured to cause, with the one or more processors 152, the eNB/gNB 170 to perform one or more of the operations as described herein. The one or more network interfaces 161 communicate over a network such as via the links 176 and 131. Two or more eNB/gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB/gNB 170 being physically in a different location from the RRH, and the one or more buses 157 could be implemented in part as fiber optic cable to connect the other elements of the eNB/gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The eNB/gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or eNB/gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, eNB/gNB 170, and/or NCE/MME/SGW/UDM/PCF/AMM/SMF/LMF/LMC 190 as in FIG. 6.

It is noted that any functionality or functionalities, in accordance with example embodiments of the invention, of any devices as shown in FIG. 6 e.g., the UE 110 and/or eNB/gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 6 at least via the wireless link 111 and/or via the NCE/MME/SGW/UDM/PCF/AMM/SMF/LMF/LMC 190 using link 199 to Other Network(s)/Internet as in FIG. 6.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In accordance with example embodiments of the invention as at least described in the paragraphs above there are methods and an apparatus to include at least means for determining (one or more transceivers 130, Memory(ies) 125, Computer Program Code 123 and/or Bundling Module 140-2, and Processor(s) 120 and/or Bundling Module 140-1 as in FIG. 6), by a user equipment (UE 110 as in FIG. 6) of a communication network (Network 100 as in FIG. 6), information comprising a physical uplink control channel resource set allocation and an indication of subcarrier spacing used for a physical uplink control channel; means, based on the information, for determining (one or more transceivers 130, Memory(ies) 125, Computer Program Code 123 and/or Bundling Module 140-2, and Processor(s) 120 and/or Bundling Module 140-1 as in FIG. 6) at least one of a size or allocation of subcarrier spacing for the physical uplink control channel resource set allocation; and means for transmitting (one or more transceivers 130, Memory(ies) 125, Computer Program Code 123 and/or Bundling Module 140-2, and Processor(s) 120 and/or Bundling Module 140-1 as in FIG. 6) information associated with the physical uplink control channel to the communication network using at least the determined at least one size and allocation of the one or more physical uplink control channel resources.

In the example aspect of the invention according to the paragraph above, wherein at least the means for determining and transmitting comprises a non-transitory computer readable medium [Memory(ies) 125 as in FIG. 6] encoded with a computer program [Computer Program Code 123 and/or Bundling Module 140-2 as in FIG. 6] executable by at least one processor [Processor(s) 120 and/or Bundling Module 140-1 as in FIG. 6].

A non-transitory computer-readable medium (Memory(ies) 155 of FIG. 6) storing program code (Computer Program Code 153 and/or Bundling Module 150-2 as in FIG. 6), the program code executed by at least one processor (Processor(s) 120 and/or Bundling Module 150-1 as in FIG. 6) to perform the operations as at least described in the paragraphs above.

In accordance with an example embodiment of the invention as described above there is an apparatus comprising: means for communicating (one or more transceivers 160, Memory(ies) 155, Computer Program Code 153 and/or Bundling Module 150-2, and Processor(s) 120 and/or Bundling Module 150-1 as in FIG. 6), by a network device (eNB/gNB 170 as in FIG. 6) of a communication network (Network 100 as in FIG. 6), at least one data burst comprising at least one data block towards an access node of the communication network, wherein the communicating comprises: means for determining (one or more transceivers 160, Memory(ies) 155, Computer Program Code 153 and/or Bundling Module 150-2, and Processor(s) 120 and/or Bundling Module 150-1 as in FIG. 6), a buffer status of a buffer for communicating the at least one data block with the access node. Based on the determining, means for setting (one or more transceivers 160, Memory(ies) 155, Computer Program Code 153 and/or Bundling Module 150-2, and Processor(s) 120 and/or Bundling Module 150-1 as in FIG. 6) at least one value of at least one timer for each data block of the at least one data block, wherein said at least one timer is identifying at least one given time the buffer is reserved for each data block of said at least one data block; and means, based on at least said at least one given time, for communicating (one or more transceivers 160, Memory(ies) 155, Computer Program Code 153 and/or Bundling Module 150-2, and Processor(s) 120 and/or Bundling Module 150-1 as in FIG. 6) the at least one data burst with the access node, wherein the at least one value of said at least one timer is determined based on a volume of each data block.

In general, various embodiments of the UE 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As similarly stated above, example embodiments of the invention provide solutions to solve the problem presented herein, i.e., in case a PUCCH channel (whose resources are either dynamically indicated or RRC configured) occurs in between (and without overlapping with any symbols of) two adjacent PUSCH repetitions, or PUSCH transmissions of the same TB over multiple slots, and is characterized by different settings (at least in terms of PRB allocation) than the PUSCH channel.

In the first solution in accordance with example embodiments of the invention, there is proposed to multiplex the UCI on PUSCH even if the PUCCH and PUSCH resources do not overlap in time domain, to guarantee phase continuity. UCI multiplexing on PUSCH is not novel per se and already supported by the specifications. However, it is currently limited to the cases where the PUSCH and PUCCH resources overlap in time (3GPP TS 38.213). Without joint channel estimation which is a new Rel-17 feature, there is indeed currently no specific reason to multiplex UCI on PUSCH if the two channels do not overlap in time, since ensuring phase continuity between two logically consecutive transmissions is not required.

In our case, however, considering that the PUCCH occurs in between PUSCH transmissions over multiple slots in which the UE is expected to maintain phase continuity, and that the PUCCH has a different PRB allocation than the PUSCH, it is advantageous to multiplex the UCI on the PUSCH even if the resources do not overlap in time, in order to maintain phase continuity.

In the second solution in accordance with example embodiments of the invention, there is proposed that the PUCCH resources over which the UCI is conveyed are dynamically and purposely modified to reflect the repeated PUSCH resources and allow the UE to keep phase continuity. It is indeed confirmed by RAN4 that if other UL channels in between repetitions (or multi-slot transmissions) have the same settings in occupied PRBs as the PUCCH or PUSCH repetitions (or multi-slot transmissions), then it is feasible to maintain the phase continuity and power consistency across the PUCCH or PUSCH repetitions (or multi-slot transmissions).

Rules describing the dynamic modification would be hard-coded in the specification or hard-coded into a device such as the UE 110 or eNB/gNB 170 as in FIG. 6, to ensure that no ambiguity could exist between behaviour at UE and expected channel configuration at gNB.

Solution 1

Figure 2:
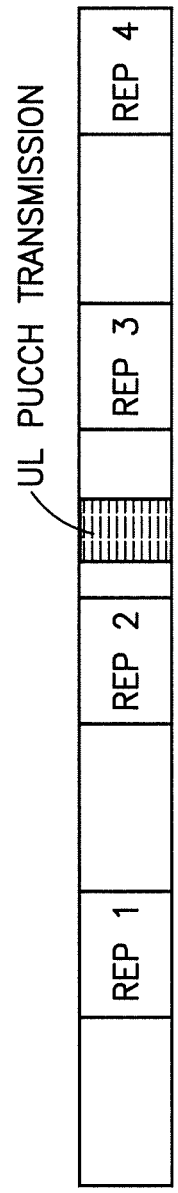
FIG. 2 shows non-back-to-back PUSCH repetitions with a PUCCH transmission in between repetition 2 and 3.
Figure 3:
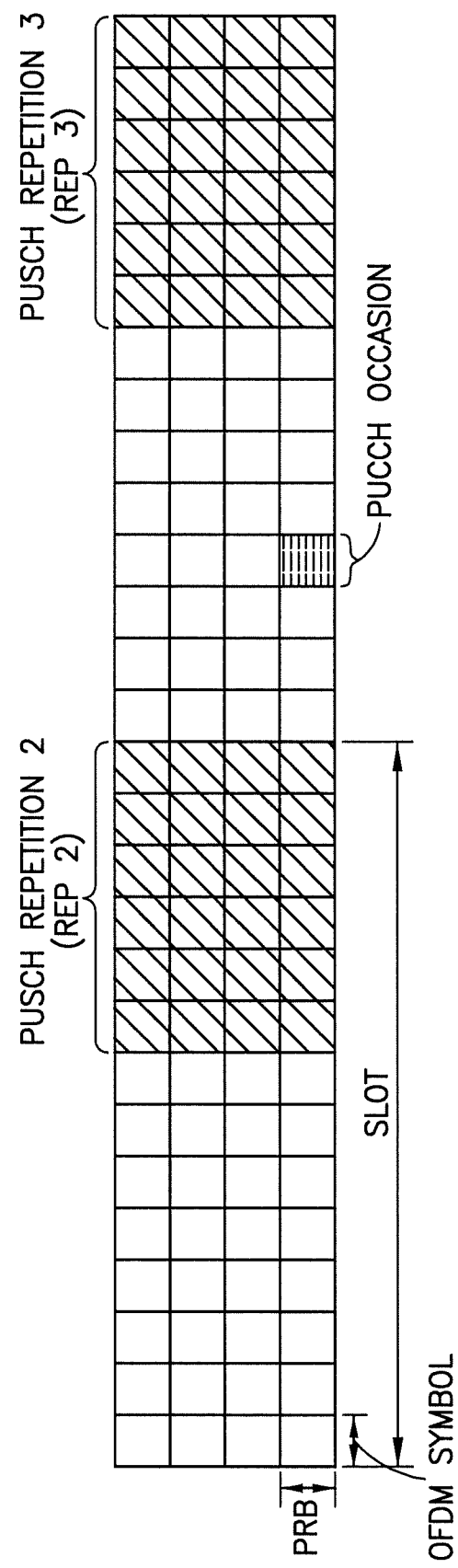
FIG. 3 shows a zoom-in of the non-back-to-back PUSCH repetitions scenario with a PUCCH transmission.

Consider the example of FIG. 3, where a zoom-in of the second and third slot of the scenario depicted in FIG. 2 is provided. In this example, PUSCH is repeated in the second and third slot and occupies 4 PRBs in the last six OFDM symbols of the slot (patterned part). A PUCCH occasion which occupies only 1 PRB occurs in between the second and third repetition, specifically in the $4^{th}$ symbol of the third slot.

The following procedure is performed by the UE:
1. Based on the System Frame Number (SFN), UE knows that slot 3 (in the example) is the slot where a PUCCH is to be transmitted,
2. UE analyzes the corresponding PUCCH resources and compares the location and number of PRBs (PUCCH$_{PRS}$) with the location and number of PRBs occupied by the PUSCH repetitions (PUSCH$_{PRB}$) occurring prior and after the resources over which the PUCCH should be transmitted, as per step 1,
3. If PUCCH$_{PRS}$=PUSCH$_{PRB}$
   UE transmits the PUCCH in the original configured or indicated PUCCH occasion.
   else if PUCCH$_{PRS}$≠PUSCH$_{PRB}$
   UE does not transmit the PUCCH in the original configured or indicated PUCCH occasion but multiplexes the UCI with the previous or following PUSCH repetition. A pictorial representation of this behavior is shown in FIG. 4,
   End,
4. In the second case of PUCCH$_{PRB}$≠PUSCH$_{PRB}$, UE decides whether to multiplex the UCI in the previous or following transmission based on certain timeline conditions.
   If the gap between two consecutive repetitions is equal to x OFDM symbols, the UE:
   a. multiplexes the UCI on previous repetition occasion (rep2 in example) if the PUCCH occasion occurs in an OFDM symbol which is spaced from the end of the previous repetition occasion by less or equal than X/2 symbols, and
   b. multiplexes the UCI on following repetition occasion (rep3 in example) if the PUCCH occasion occurs in an OFDM symbol which is spaced from the end of the previous repetition occasion by more than X/2 symbols,
   Alternatively, the UE always multiplexes the UCI on following repetition occasion, or the UE multiplexes the UCI on the following repetition occasion that is not associated with a self-decodable redundancy version index, where a redundancy version index indicates the part of encoded bits that are mapped to the physical uplink shared channel.
   In the example of FIG. 3 the UE would multiplex the UCI on the previous repetition occasion (rep2), as also shown in FIG. 4.
   In addition, the UE applies step 4a or 4b only if the last symbol of the PDSCH associated to a DCI scheduling the PUCCH transmission (in the case of scheduled PUCCH) comes at least Y symbols earlier than the PUSCH repetition occasion over which the corresponding UCI would be multiplexed. Otherwise, the UCI is multiplexed on the subsequent PUSCH repetition occasion.
5. In yet another example embodiment, the UE performs the UCI multiplexing only if the UCI payload is smaller than a threshold, which could, for instance, be set in order not to affect the performance of PUSCH repetitions significantly. Details on this method are disclosed herein.

Solution 1 is an effective and relatively simple way of solving the problem at hand in this document, however it may also be characterized by a drawback, i.e., UCI multiplexing could decrease the reliability of the PUSCH repetition hosting the UCI. This is due to the fact that part of the PUSCH resources used for carrying UCI as described above are not used for PUSCH, causing a reduction of the effective code rate of the PUSCH transmission, in turn decreasing its reliability. The extent of this drawback, whose relevance would vary in a case by case fashion, would depend on the size of the UCI payload multiplex over the PUSCH resources.

Indeed, if Solution 1 is only used for small payloads, as it is the case in most coverage limited situations, the impact on PUSCH reliability would be arguably negligible. The last statement is particularly true if it is considered that benefits brought by the application of the joint channel estimation at gNB, thanks to the UCI multiplexing which preserves the phase continuity, would be generally larger than the losses arguably brought by the UCI multiplexing.

An alternative way to address this drawback, when present, is given by Solution 2, as described below.

Solution 2

This solution provides a different way of maintaining phase continuity when a PUCCH occasion occurs in between PUSCH transmissions, irrespective of the settings of the involved PUCCH and PUSCH transmissions.

To describe this solution let us consider again the example of FIG. 3.

The following procedure is performed by the UE:
1. Based on the System Frame Number (SFN), UE knows that slot 3 (in the example) is the slot where a PUCCH is to be transmitted,
2. UE analyzes the corresponding PUCCH resources and compares the location and number of PRBs ($PUCCH_{PRS}$) with the location and number of PRBs occupied by the PUSCH repetitions or transmissions ($PUSCH_{PRB}$),
3. If $PUCCH_{PRS}=PUSCH_{PRB}$
    UE transmits the PUCCH with the originally configured or indicated PUCCH time-frequency resources.
    else if $PUCCH_{PRS} \neq PUSCH_{PRB}$
    UE temporarily adapts the configured or indicated PUCCH frequency resources to obtain $PUCCH_{PRB}=PUSCH_{PRB}$. The new configuration is shown in FIG. 5. This can be achieved by rate matching (repeating, in the example) the UCI codeword to match the new resource allocation (4 PRBs, in the example). The adapted resource is used to convey either the uplink control information only or both uplink control information and uplink data information. This new configuration is temporary and will be valid only for that particular PUCCH transmission,
    End,
1. In one example embodiment, the UE applies step 3 only if the $PUSCH_{PRB}$ is smaller than or equal to a threshold. Details on this method are disclosed at least below.

This solution provides an alternative and effective way to solve the drawback of Solution 1, since phase continuity is maintained without the need of multiplexing the UCI over the PUSCH. In addition, the reliability of the PUSCH repetitions is never impacted in this case. However, even if there is no impact to PUSCH transmissions, this solution comes at the cost of possible collisions with other LTE(s) which are scheduled/configured to transmit in the adjacent PRBs of the original configuration. In the example of FIG. 5 if other UEs were scheduled or configured to transmit in the $2^{nd}$, $3^{rd}$ or $4^{th}$ PRBs, there would be a collision when the UE extends its configured resource.

Both solutions have hence their advantages and disadvantages, and as at least shown below will provide methods to dynamically use the best solution based on network operation.

Dynamic Selection of the Proposed Solutions

Whether solution 1 or solution 2 provides the most advantages (while both keeping phase continuity) depends on a set of non-deterministic factors. For this reason, below are provided methods for dynamically select (by the UE) or indicate (by the gNB) the best option based on network operation.

If only one solution is specified, the following methods are still valid to enable UE to select or gNB to indicate whether to apply the solution to the specific scenario.

Autonomous Selection by the UE

The following methods could be adopted by the UE (in coordination with gNB) to autonomously select Solution 1:
1. A threshold on the UCI payload size could be either specified or configured by the gNB so that Solution 1 is chosen only if the UCI payload size is smaller than the threshold, and
2. A threshold on the ratio between the REs occupied by the multiplexed UCI and the total REs of PUSCH, or on the ratio between the UCI payload size and PUSCH payload, could be either specified or configured by the gNB so that Solution 1 is chosen only if the ratio is smaller than the threshold.

In the case the metric (UCI size or ratio) is larger than the threshold, the UE either uses Solution 2 (if specified in addition to Solution 1) or does not multiplex and transmits the PUSCH resource as is or completely drops the PUCCH transmission. The idea behind this thresholding method is that the impairment to PUSCH reliability depends on the number of consumed resources by the UCI. The threshold would then be defined such that the UE picks Solution 1 only when the impairment to PUSCH reliability is negligible.

In a different example embodiment, the UE applies Solution 2 only if the $PUSCH_{PRB}$ is smaller than or equal to a second threshold. This second threshold would be different than previous thresholds on the UCI size (if both solutions are specified), and could still be configured by gNB or specified. Indeed, extending PUCCH excessively could create problems such as more likely collisions or reduced EPRE. So, if both solutions are specified and the UCI payload size is above a threshold, UE would not use Solution 2 if the $PUSCH_{PRB}$ is greater than a second threshold. In this case, the UE either does not multiplex and transmits the PUCCH resource as is, or completely drops the PUCCH transmission.

In the case both solutions are specified, a priority rule needs to be specified to avoid ambiguity when both conditions for Solution 1 and Solution 2 are met. In an example embodiment UE could first look at conditions to autonomously select Solution 1 (i.e., UCI payload size smaller than a threshold), and switch to conditions to autonomously select Solution 2 (i.e. $PUSCH_{PRB}$ smaller than or equal to a second threshold) only if the conditions for choosing Solution 1 are not met.

It is also worth noticing that gNB is fully aware of the UCI size for a certain PUCCH occasion or of the number of occupied RBs, such that full coordination between the two nodes can always be assumed, or realized de facto even implicitly due to lack of ambiguity.

Dynamic Indication by gNB

In this case, gNB explicitly indicates which solution to pick through DCI. A new field or an existing field could be used for this indication.

Indeed, gNB has full control of network operation and may instruct the UE to do one of the following:
1. Use Solution 1, for example when the UCI size is small enough or when the neighboring PRBs to the configured PUCCH resources are expected to be occupied by other transmissions/UEs. The proposed indication could help avoid collisions that may occur when extending the configured allocation with Solution 2, since gNB may have configured another UE to transmit PUCCH in the neighboring PRBs,
2. Use Solution 2, for example when the UCI size is not small enough or more generally when the neighboring PRBs to the configured PUCCH resources are not expected to be occupied by other transmissions/UEs. This way the gNB would be able to preserve the reliability of the PUSCH transmissions and receive UCI information from the UE without breaking the phase continuity,
3. Do nothing and transmit the PUCCH resource as is. In this case the gNB will not expect UE to be able to keep phase continuity across the repetitions, and/or
4. Skip the transmission of the PUCCH resource. In this case the gNB renounces to UCI information in order to keep phase continuity across the repetitions.

In its most straightforward implementation, a field with 2 bits would be sufficient to instruct the UE to follow a certain behaviour.

A semi-static configuration provided via higher-layer signalling could also be given to the UEs in the cell, either common or dedicated, to configure the suitable behaviour according to the 4 possibilities above. Such configuration could either be related to how a periodic PUCCH is to be transmitted when occurring in between two PUSCH repetitions, or included in each PUCCH resource configuration.

Figure 7A:
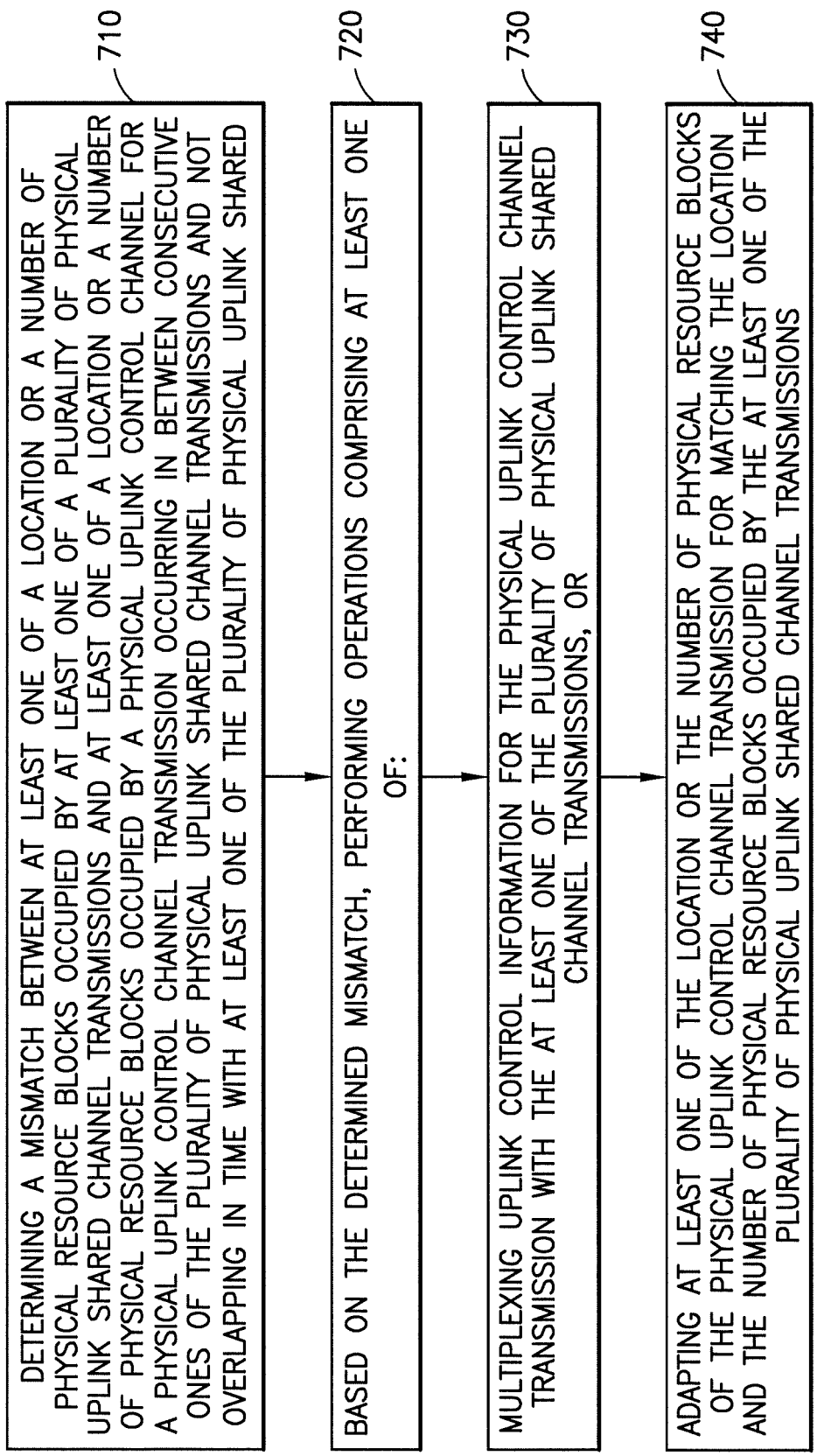
FIG. 7A and FIG. 7B each show a method in accordance with example embodiments of the invention which may be performed by an apparatus.
Figure 7B:
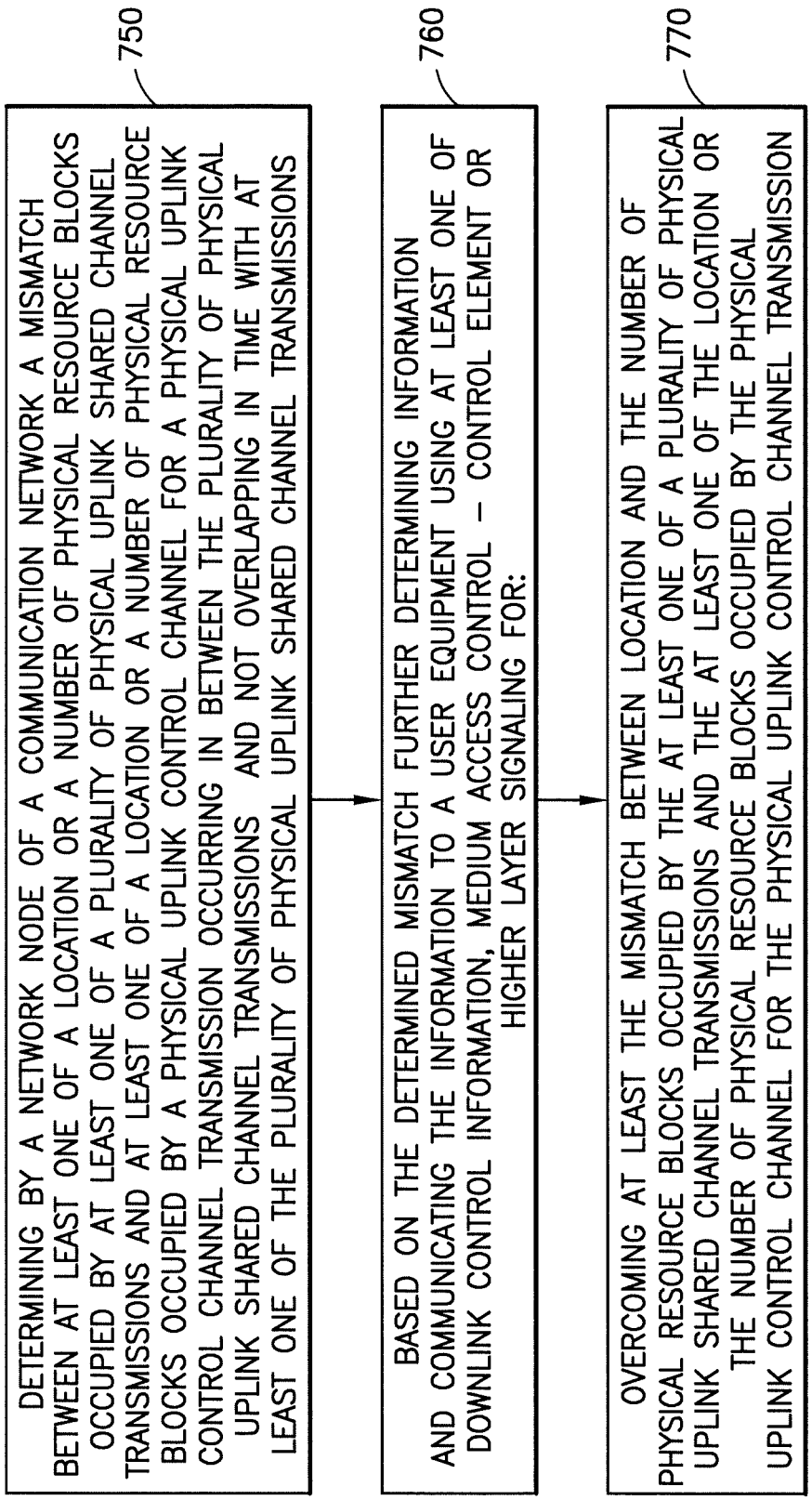

FIG. 7A and FIG. 7B each show a method in accordance with example embodiments of the invention which may be performed by an apparatus.

FIG. 7A illustrates operations which may be performed by a device such as, but not limited to, a device (e.g., the UE 110 as in FIG. 6). As shown in step 710 of FIG. 7A there is determining a mismatch between at least one of a location or a number of physical resource blocks occupied by at least one of a plurality of physical uplink shared channel transmissions and at least one of a location or a number of physical resource blocks occupied by a physical uplink control channel for a physical uplink control channel transmission occurring in between consecutive ones of the plurality of physical uplink shared channel transmissions and not overlapping in time with at least one of the plurality of physical uplink shared channel transmissions. As shown in step 720 of FIG. 7A there is based on the determined mismatch, perform operations comprising at least one of. As shown in step 7330 of FIG. 7A the one of: is multiplexing uplink control information for the physical uplink control channel transmission with the at least one of the plurality of physical uplink shared channel transmissions, or as shown in step 740 of FIG. 7A adapting the at least one of the location or the number of physical resource blocks of the physical uplink control channel transmission for matching the location and the number of physical resource blocks occupied by the at least one of the plurality of physical uplink shared channel transmissions.

In accordance with the example embodiments as described in the paragraph above, wherein multiplexing uplink control information for the physical uplink control channel transmission with the at least one of the plurality of physical uplink shared channel transmissions is based on timeline conditions.

In accordance with the example embodiments as described in the paragraphs above, wherein based on the gap between two consecutive physical uplink shared channel transmissions of the plurality of physical uplink shared channel transmissions being equal to X orthogonal frequency division multiplexing symbols, where X is an integer, the user equipment is configured to perform at least one of: multiplexing the uplink control information in a previous physical uplink shared channel transmission occasion if the physical uplink control channel occasion occurs in an orthogonal frequency division multiplexing symbol which is spaced from an end of a previous physical uplink shared channel transmission occasion by less or equal than X/2 symbols, or multiplexing the uplink control information in following physical uplink shared channel transmission occasion if the physical uplink control channel occasion occurs in an orthogonal frequency division multiplexed symbol which is spaced from an end of a previous physical uplink shared channel transmission occasion by more than X/2 symbols or multiplexing the uplink control information in a following physical uplink shared channel transmission occasion right after the physical uplink control channel, or multiplexing the uplink control information in a following physical uplink shared channel transmission occasion that is not associated with a self-decodable redundancy version index, wherein a redundancy version index indicates the part of encoded bits that are mapped to the physical uplink shared channel.

In accordance with the example embodiments as described in the paragraphs above, wherein the performing is based on a further conditioned on a last orthogonal frequency division multiplexing symbol of a physical downlink shared channel associated with downlink control information scheduling the physical uplink control channel transmission being at least Y orthogonal frequency division multiplexing symbols earlier than a first orthogonal frequency division multiplexing symbol of the physical uplink shared channel transmission over which the corresponding uplink control information would be multiplexed, wherein if the further condition is not satisfied, the multiplexing is performed on the next physical uplink shared channel that satisfies the condition or the multiplexing is not performed.

In accordance with the example embodiments as described in the paragraphs above, wherein the multiplexing of the uplink control information on the physical uplink shared channel is further based on a determined uplink control information payload size of the uplink control information being less than a first threshold value.

In accordance with the example embodiments as described in the paragraphs above, wherein the multiplexing of the uplink control information on the physical uplink shared channel is further based on a ratio between resource elements occupied by the multiplexed uplink control information and resource elements of the physical uplink shared channel being less than a second threshold value.

In accordance with the example embodiments as described in the paragraphs above, wherein adapting the physical resource blocks of the physical uplink control channel for matching the location and number of physical resource blocks occupied by the at least one of the plurality of physical uplink shared channel transmissions is based on the physical resource blocks occupied by the at least one of the plurality of physical uplink shared channel transmission being less than or equal to a third threshold value, wherein the physical uplink control channel after the adaptation is used to convey either the uplink control information only or both uplink control information and uplink data information.

In accordance with the example embodiments as described in the paragraphs above, wherein at least one of the first threshold, the second threshold or the third threshold is received by the user equipment from the network node of the communication network.

In accordance with the example embodiments as described in the paragraphs above, wherein a downlink control information is received from a network node of the communication network, and wherein the downlink control information instructs the user equipment which of the operations to perform based on the mismatch.

In accordance with the example embodiments as described in the paragraphs above, wherein the plurality of physical uplink shared channel transmissions is of at least one of a same physical uplink shared channel or different physical uplink shared channels.

In accordance with the example embodiments as described in the paragraphs above, wherein the adapting is a temporary adaptation valid for at least one physical uplink control channel transmission.

A non-transitory computer-readable medium (Memory(ies) 125 as in FIG. 6) storing program code (Computer Program Code 125 and/or Bundling Module 140-2 as in FIG. 6), the program code executed by at least one processor (Processor(s) 120 and/or Bundling Module 140-1 as in FIG. 6) to perform the operations as at least described in the paragraphs above.

In accordance with an example embodiment of the invention as described above there is an apparatus comprising: means for determining a mismatch between at least one of a location or a number of physical resource blocks occupied by at least one of a plurality of physical uplink shared channel transmissions and at least one of a location or a number of physical resource blocks occupied by a physical uplink control channel for a physical uplink control channel transmission occurring in between consecutive ones of the plurality of physical uplink shared channel transmissions and not overlapping in time with at least one of the plurality of physical uplink shared channel transmissions; and means, based on the determined mismatch, for performing operations comprising at least one of: multiplexing uplink control information for the physical uplink control channel transmission with the at least one of the plurality of physical uplink shared channel transmissions, or adapting the at least one of the location or the number of physical resource blocks of the physical uplink control channel transmission for matching the location and the number of physical resource blocks occupied by the at least one of the plurality of physical uplink shared channel transmissions.

In the example aspect of the invention according to the paragraph above, wherein at least the means for determining and performing comprises a non-transitory computer readable medium [Memory(ies) 125 as in FIG. 6] encoded with a computer program [Computer Program Code 125 and/or Bundling Module 140-2 as in FIG. 6] executable by at least one processor [Processor(s) 120 and/or Bundling Module 140-1 as in FIG. 6].

FIG. 7B illustrates operations which may be performed by a device such as, but not limited to, a device (e.g., the eNB/gNB 170 as in FIG. 6). As shown in step 750 of FIG. 7B there is determining by a network node of a communication network a mismatch between at least one of a location or a number of physical resource blocks occupied by at least one of a plurality of physical uplink shared channel transmissions and at least one of a location or a number of physical resource blocks occupied by a physical uplink control channel for a physical uplink control channel transmission occurring in between the plurality of physical uplink shared channel transmissions and not overlapping in time with at least one of the plurality of physical uplink shared channel transmissions. As shown in step 760 of FIG. 7B there is, based on the determined mismatch further determine an information and communicate the information to a user equipment using at least one of downlink control information, medium access control—control element or higher layer signaling for. As shown in step 770 of FIG. 7B the for: is for overcoming at least the mismatch between location and the number of physical resource blocks occupied by the at least one of a plurality of physical uplink shared channel transmissions and the at least one of the location or the number of physical resource blocks occupied by the physical uplink control channel for the physical uplink control channel transmission.

In accordance with the example embodiments as described in the paragraph above, wherein the information is instructing the user equipment to, perform at least one of: multiplexing uplink control information for the physical uplink control channel transmission with the at least one of the plurality of physical uplink shared channel transmissions, or adapting the location and the number of physical resource blocks of the physical uplink control channel transmission for matching the location and the number of physical resource blocks occupied by the at least one of the plurality of physical uplink shared channel transmissions.

In accordance with the example embodiments as described in the paragraphs above, wherein based on a size of the uplink control information being smaller than at least one threshold or based on neighboring physical resource blocks to the configured and/or scheduled physical resource blocks of the physical uplink control channel expected to be occupied by at least one of other transmissions of other user equipment, the information is indicating to perform the operation of: multiplexing uplink control information for the physical uplink control channel transmission with the at least one of the plurality of physical uplink shared channel transmissions.

In accordance with the example embodiments as described in the paragraphs above, multiplexing uplink control information for the physical uplink control channel transmission with the at least one of the plurality of physical uplink shared channel transmissions.

In accordance with the example embodiments as described in the paragraphs above, wherein based on a size of the uplink control information being larger than at least one threshold or based on neighboring physical resource blocks to the configured and/or scheduled physical resource blocks of the physical uplink control channel not expected to be occupied by at least one of other transmissions of other user equipment, the downlink control information is indicating to perform the operation of: adapting the physical resource blocks of the physical uplink control channel transmission for matching the physical resource blocks occupied by the at least one of the plurality of physical uplink shared channel.

In accordance with the example embodiments as described in the paragraphs above, wherein based on a size of the uplink control information being smaller than at least one threshold or based on neighboring physical resource blocks to the configured and/or scheduled physical resource blocks of the physical uplink control channel expected to be occupied by at least one of other transmissions of other user equipment, the information is indicating to perform the operation of: multiplexing uplink control information for the physical uplink control channel transmission with the at least one of the plurality of physical uplink shared channel transmissions.

In accordance with the example embodiments as described in the paragraphs above, wherein based on a size of the uplink control information being larger than at least one threshold or based on neighboring physical resource blocks to the configured and/or scheduled physical resource blocks of the physical uplink control channel not expected to be occupied by at least one of other transmissions of other user equipment, the downlink control information is indicating to perform the operation of: adapting the physical resource blocks of the physical uplink control channel transmission for matching the physical resource blocks occupied by the at least one of the plurality of physical uplink shared channel.

In accordance with the example embodiments as described in the paragraphs above, wherein the plurality of physical uplink shared channel transmissions is of at least one of a same physical uplink shared channel or different physical uplink shared channels.

In accordance with the example embodiments as described in the paragraphs above, wherein the at least one of the at least one threshold is indicated in the information from the network node.

A non-transitory computer-readable medium (Memory(ies) 155 as in FIG. 6) storing program code (Computer Program Code 153 and/or Bundling Module 150-2 as in FIG. 6), the program code executed by at least one processor (Processor(s) 152 and/or Bundling Module 150-1 as in FIG. 6) to perform the operations as at least described in the paragraphs above.

In accordance with an example embodiment of the invention as described above there is an apparatus comprising: means for determining by a network node of a communication network a mismatch between at least one of a location or a number of physical resource blocks occupied by at least one of a plurality of physical uplink shared channel transmissions and at least one of a location or a number of physical resource blocks occupied by a physical uplink control channel for a physical uplink control channel transmission occurring in between the plurality of physical uplink shared channel transmissions and not overlapping in time with at least one of the plurality of physical uplink shared channel transmissions; and means, based on the determined mismatch, for further determining information and communicating the information to a user equipment using at least one of downlink control information, medium access control—control element or higher layer signaling for: overcoming at least the mismatch between location and the number of physical resource blocks occupied by the at least one of a plurality of physical uplink shared channel transmissions and the at least one of the location or the number of physical resource blocks occupied by the physical uplink control channel for the physical uplink control channel transmission.

In the example aspect of the invention according to the paragraph above, wherein at least the means for determining and performing comprises a non-transitory computer readable medium [Memory(ies) 155 as in FIG. 6] encoded with a computer program [Computer Program Code 153 and/or Bundling Module 150-2 as in FIG. 6] executable by at least one processor [Processor(s) 152 and/or Bundling Module 150-1 as in FIG. 6].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
 (a) hardware-only circuit implementations (such as implementations in only analog and/or digital circuitry);
 (b) combinations of hardware circuits and software, such as (as applicable):
   (i) a combination of analog and/or digital hardware circuit(s) with software/firmware; and
   (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
 (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
at least one processor; and
at least one non-transitory memory storing instructions that when executed by the at least one processor, cause the apparatus to at least:
determine a mismatch between at least one of a location or the number of physical resource blocks occupied by at least one of a plurality of physical uplink shared channel transmissions and at least one of a location or the number of physical resource blocks occupied by a physical uplink control channel for a physical uplink control channel transmission occurring in between consecutive ones of the plurality of physical uplink shared channel transmissions and not overlapping in time with at least one of the plurality of physical uplink shared channel transmissions; and
based on the determined mismatch, perform operations comprising at least one of;
multiplexing uplink control information for the physical uplink control channel transmission with the at least one of the plurality of physical uplink shared channel transmissions, or
adapting the at least one of the location or the number of physical resource blocks of the physical uplink control channel transmission for matching the location and the number of physical resource blocks occupied by the at least one of the plurality of physical uplink shared channel transmissions,
wherein the multiplexing of the uplink control information on the physical uplink shared channel is further based on a ratio between resource elements occupied by the multiplexed uplink control information and resource elements of the physical uplink shared channel being less than a second threshold value.

2. The apparatus of claim 1, wherein multiplexing uplink control information for the physical uplink control channel transmission with the at least one of the plurality of physical uplink shared channel transmissions is based on timeline conditions.

3. The apparatus of claim 2, wherein based on the gap between two consecutive physical uplink shared channel transmissions of the plurality of physical uplink shared channel transmissions being equal to X orthogonal frequency division multiplexing symbols, where X is an integer, the user equipment is configured to perform at least one of:
multiplexing the uplink control information in a previous physical uplink shared channel transmission occasion if the physical uplink control channel occasion occurs in an orthogonal frequency division multiplexing symbol which is spaced from an end of a previous physical uplink shared channel transmission occasion by less or equal than X/2 symbols, or
multiplexing the uplink control information in a following physical uplink shared channel transmission occasion if the physical uplink control channel occasion occurs in an orthogonal frequency division multiplexed symbol which is spaced from an end of a previous physical uplink shared channel transmission occasion by more than X/2 symbols, or
multiplexing the uplink control information in a following physical uplink shared channel transmission occasion right after the physical uplink control channel, or
multiplexing the uplink control information in a following physical uplink shared channel transmission occasion that is not associated with a self-decodable redundancy version index, wherein a redundancy version index indicates the part of encoded bits that are mapped to the physical uplink shared channel.

4. The apparatus of claim 3, wherein the performing is based on a further condition on a last orthogonal frequency division multiplexing symbol of a physical downlink shared channel associated with downlink control information scheduling the physical uplink control channel transmission being at least Y orthogonal frequency division multiplexing symbols earlier than a first orthogonal frequency division multiplexing symbol of the physical uplink shared channel transmission over which the corresponding uplink control information would be multiplexed, wherein if the further condition is not satisfied, the multiplexing is performed on the next physical uplink shared channel that satisfies the condition or the multiplexing is not performed.

5. The apparatus or claim 1, wherein the multiplexing of the uplink control information on the physical uplink shared channel is further based on a determined uplink control information payload size of the uplink control information being less than a first threshold value.

6. The apparatus of claim 5, wherein at least the first threshold value is received by the user equipment from the network node of the communication network.

7. The apparatus of claim 1, wherein adapting the physical resource blocks of the physical uplink control channel for matching the location and number of physical resource blocks occupied by the at least one of the plurality of physical uplink shared channel transmissions is based on the physical resource blocks occupied by the at least one of the plurality of physical uplink shared channel transmission being less than or equal to a third threshold value, wherein the physical uplink control channel after the adaptation is used to convey either the uplink control information only or both uplink control information and uplink data information.

8. The apparatus of claim 1, wherein a downlink control information is received from a network node of the communication network, and wherein the downlink control information instructs the user equipment which of the operations to perform based on the mismatch.

9. The apparatus of claim 1, wherein the plurality of physical uplink shared channel transmissions is of at least one of a same physical uplink shared channel or different physical uplink shared channels.

10. The apparatus of claim 1, wherein the adapting is a temporary adaptation valid for at least one physical uplink control channel transmission.

11. A method, comprising:
   determining a mismatch between at least one of a location or a number of physical resource blocks occupied by at least one of a plurality of physical uplink shared channel transmissions and at least one of a location or a number of physical resource blocks occupied by a physical uplink control channel for a physical uplink control channel transmission occurring in between consecutive ones of the plurality of physical uplink shared channel transmissions and not overlapping in time with at least one of the plurality of physical uplink shared channel transmissions; and
   based on the determined mismatch, performing operations comprising at least one of:
      multiplexing uplink control information for the physical uplink control channel transmission with the at least one of the plurality of physical uplink shared channel transmissions, or
      adapting the location and the number of physical resource blocks of the physical uplink control channel transmission for matching the location and the number of physical resource blocks occupied by the at least one of the plurality of physical uplink shared channel transmissions,
   wherein the multiplexing of the uplink control information on the physical uplink shared channel is further based on a ratio between resource elements occupied by the multiplexed uplink control information and resource elements of the physical uplink shared channel being less than a second threshold value.

12. The method of claim 11, wherein multiplexing uplink control information for the physical uplink control channel transmission with the at least one of the plurality of physical uplink shared channel transmissions is based on timeline conditions.

13. The method of claim 12, wherein based on the gap between two consecutive physical uplink shared channel transmissions of the plurality of physical uplink shared channel transmissions being equal to X orthogonal frequency division multiplexing symbols, where X is an integer, the user equipment is configured to perform at least one of:
   multiplexing the uplink control information in a previous physical uplink shared channel transmission occasion if the physical uplink control channel occasion occurs in an orthogonal frequency division multiplexing symbol which is spaced from an end of a previous physical uplink shared channel transmission occasion by less or equal than X/2 symbols, or
   multiplexing the uplink control information in following physical uplink shared channel transmission occasion if the physical uplink control channel occasion occurs in an orthogonal frequency division multiplexed symbol which is spaced from an end of a previous physical uplink shared channel transmission occasion by more than X/2 symbols, or
   multiplexing the uplink control information in a following physical uplink shared channel transmission occasion right after the physical uplink control channel, or
   multiplexing the uplink control information in a following physical uplink shared channel transmission occasion that is not associated with a self-decodable redundancy version index, wherein a redundancy version index indicates the part of encoded bits that are mapped to the physical uplink shared channel.

14. An apparatus comprising:
   at least one processor; and
   at least one non-transitory memory storing instructions that when executed by the at least one processor, cause the apparatus to at least:
      determine by a network node of a communication network a mismatch between at least one of a location or a number of physical resource blocks occupied by at least one of a plurality of physical uplink shared channel transmissions and at least one of a location or a number of physical resource blocks occupied by a physical uplink control channel for a physical uplink control channel transmission occurring in between the plurality of physical uplink shared channel transmissions and not overlapping in time with at least one of the plurality of physical uplink shared channel transmissions; and
      based on the determined mismatch further determine an information and communicate the information to a user equipment using at least one of downlink control information, medium access control—control element or higher layer signaling for:

overcoming at least the mismatch between location and the number of physical resource blocks occupied by the at least one of a plurality of physical uplink shared channel transmissions and location and the number of physical resource blocks occupied by the physical uplink control channel for the physical uplink control channel transmission, wherein the information is instructing the user equipment to, perform at least one of:

multiplexing uplink control information for the physical uplink control channel transmission with the at least one of the plurality of physical uplink shared channel transmissions, or adapting the location and the number of physical resource blocks of the physical uplink control channel transmission for matching the location and the number of physical resource blocks occupied by the at least one of the plurality of physical uplink shared channel transmissions, and wherein the multiplexing of the uplink control information on the physical uplink shared channel is further based on a ratio between resource elements occupied by the multiplexed uplink control information and resource elements of the physical uplink shared channel being less than a second threshold value.

15. The apparatus of claim 14, wherein based on a size of the uplink control information being smaller than a threshold or based on neighboring physical resource blocks to the configured and/or scheduled physical resource blocks of the physical uplink control channel expected to be occupied by at least one of other transmissions of other user equipment, the information is indicating to perform the operation of:

multiplexing uplink control information for the physical uplink control channel transmission with the at least one of the plurality of physical uplink shared channel transmissions.

16. The apparatus of claim 15, wherein the threshold is indicated in the information from the network node.

17. The apparatus of claim 14, wherein based on a size of the uplink control information being larger than a threshold or based on neighboring physical resource blocks to the configured and/or scheduled physical resource blocks of the physical uplink control channel not expected to be occupied by at least one of other transmissions of other user equipment, the downlink control information is indicating to perform the operation of:

adapting the physical resource blocks of the physical uplink control channel transmission for matching the physical resource blocks occupied by the at least one of the plurality of physical uplink shared channel.

18. The apparatus of claim 14, wherein the plurality of physical uplink shared channel transmissions is of at least one of a same physical uplink shared channel or different physical uplink shared channels.

* * * * *